United States Patent
Taguchi et al.

[11] 3,900,856
[45] Aug. 19, 1975

[54] AUTOMATIC EXPOSURE CONTROL DEVICE

[75] Inventors: Tatsuya Taguchi, Tokyo; Yukio Iura, Yokosuka, both of Japan

[73] Assignee: Canon Kabushiki Kaisha, Tokyo, Japan

[22] Filed: June 14, 1973

[21] Appl. No.: 369,783

[30] Foreign Application Priority Data
June 26, 1972  Japan.............................. 47-063920

[52] U.S. Cl. ...................... 354/45; 354/46; 354/52
[51] Int. Cl. .............................................. G03b 9/02
[58] Field of Search ... 95/10 C, 10 CD, 64 R, 64 D; 354/45, 46, 52

[56] References Cited
UNITED STATES PATENTS

| | | | |
|---|---|---|---|
| 3,148,602 | 9/1964 | Kiper et al. | 95/64 D |
| 3,677,149 | 7/1972 | Taguchi | 95/10 C |

*Primary Examiner*—Richard A. Wintercorn
*Assistant Examiner*—Russell E. Adams, Jr.
*Attorney, Agent, or Firm*—William R. Woodward

[57] ABSTRACT

In an exchangeable lens type camera incorporating an exposure meter therein, an automatic exposure control device comprises means for scanning an ammeter needle, aperture control means and a single drive means for driving the scanning means and the control means to control the lens aperture and actuate the diaphragm in accordance with the displacement of the ammeter needle. A transmission member is provided for driving therethrough the scanning means from the drive means. The transmission member is engageable with a lock member during scanning movement to transmit the movement of the drive means to the scanning means while retaining the lock member at a predetermined position, and may release the lock member with the aid of a reaction force produced upon engagement of the scanning means with the needle, thereby permitting the lock member to prevent movement of the drive means.

5 Claims, 4 Drawing Figures

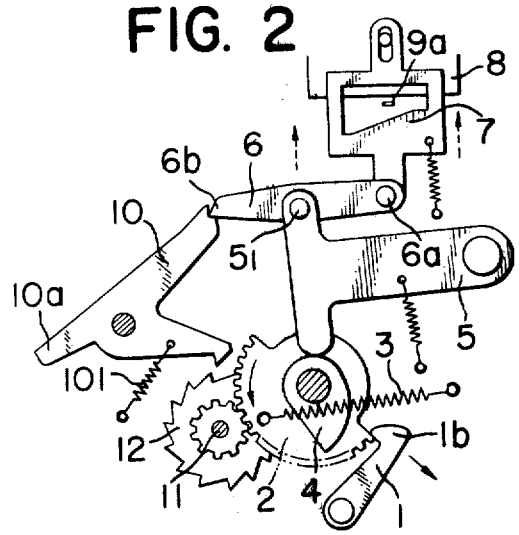
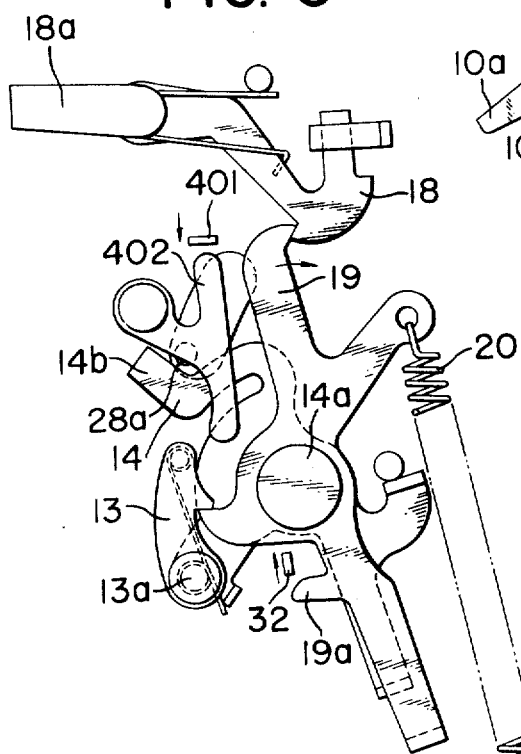
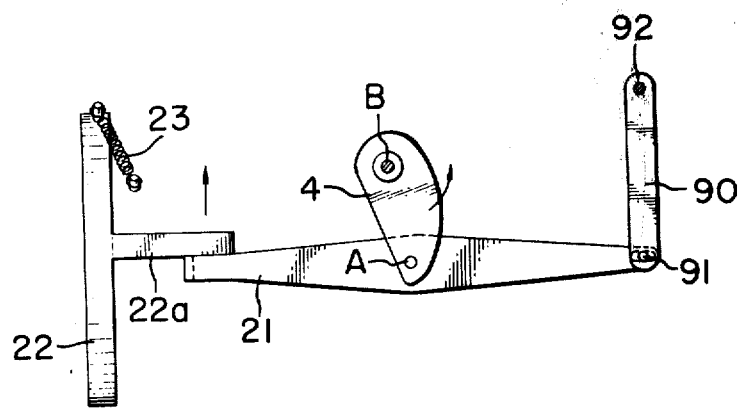

AUTOMATIC EXPOSURE CONTROL DEVICE

BACKGROUND OF THE INVENTION

1. Field of the Invention

This invention relates to an automatic exposure device for use with an interchangeable lens type camera incorporating an exposure meter therein.

2. Description of the Prior Art

In order to automatically adjust the aperture by associating an aperture control member in an interchangeable lens with the exposure meter in a camera, it is usually necessary that the aperture control member overcome the load thereon and be driven in a short time by a drive member in the camera.

However, in the conventional automatic exposure device wherein a needle scanning member is actuated by the drive member to detect the needle to determine the stop position of the aperture control member in accordance with the extent of movement of the scanning member, a load corresponding to the load on the aperture control member is still exerted on the needle through various associated members even after the scanning member has detected the needle. This in turn has led to a danger that the needle of the exposure meter is subjected to a great load which would damage such needle, in cases where a larger interchangeable lens is used to impart a greater load to the aperture control member or where the drive member is manually moved when the interchangeable lens is detached from the camera. A mechanism has already been devised to relieve the needle of some of the strain of the drive mechanism after the scanning member has detected the needle, but a more positive and complete relief is highly desirable.

SUMMARY OF THE INVENTION

It is an object of the present invention to overcome the above-noted drawback and to provide an automatic exposure control device in which the scanning member for the needle of the exposure meter may be actuated by a drive member and the stop position of the aperture control member in the interchangeable lens may be determined to set the aperture in accordance with the extent to which the scanning member is moved until it detects the needle, whereupon the reaction force produce upon detection of the needle by the scanning member actuates a lock member to lock the drive member so as to prevent any unnecessary load from being exerted on the needle.

In such a device, if the aperture control member is driven too rapidly, the control member tends to continue its movement from its own inertia even after the drive member has been stopped, so that any shutter release operation occurring before the return of the control member to its predetermined position would result in an improper exposure. To avoid this, the present invention is constructed such that a speed governor mechanism acts on the drive member to drive the aperture control mechanism at a predetermined speed and that aperture control, mirror actuation and diaphragm actuation may take place successively in a controlled manner to thereby prevent any improper exposure and damages of various members.

The invention will become fully apparent from the following detailed description of an embodiment thereof taken in conjunction with the accompanying drawings.

BRIEF DESCRIPTION OF THE DRAWINGS

FIG. 2 is a simplified front view of the essential parts of FIG. 1, in which shapes and arrangement of parts has been changed for better illustration of mechanical operation.

FIG. 3 is a side view taken along line III—III in FIG. 1, showing a few additional parts omitted on FIG. 1 for convenience of illustration.

FIG. 4 is a front view of the operating member for the aperture control member.

DESCRIPTION OF THE PREFERRED EMBODIMENTS

Figure 1:
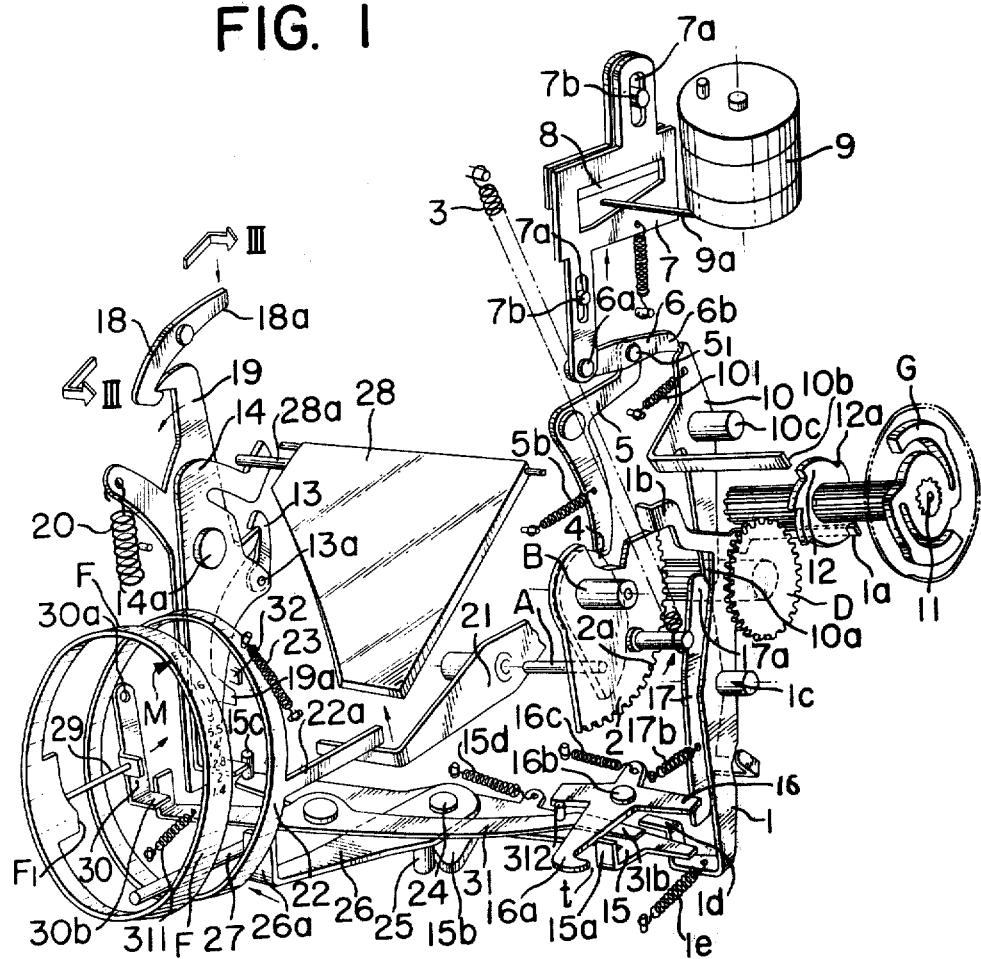
FIG. 1 is a perspective view showing the interior mechanisms of a camera provided with an automatic exposure device according to the present invention.

Referring to the drawings, there is shown the device according to an embodiment of the present invention as applied to a single lens reflex camera. In FIG. 1, the device is shown in a position where shutter charge and film advance has been completed. Numeral 9 designates an ammeter for an exposure meter and having a needle 9a. A cam plate 7 is provided to scan the displaced position of the needle 9a. The cam plate is formed with a slot 7a and is vertically slidably supported with the slot 7a receiving therein a pin 7b studded in an unshown camera body. A rocker yoke lever 6 is pivotally connected to the lower end of the cam 7 by means of a pivot pin 6a. A drive member 2 for automatic aperture control is pivotally connected to the camera body by means of a shaft B. The drive member 2 is provided thereon with a master cam 4 and a pin A, and when rotated in the direction of arrow by the force of a spring 3, the member 2 may drive the cam plate 7 and an aperture control member which will be described. A cam follower lever 5 is pivotally connected to the camera body by means of a pin 5a and has two arms, one of which is biased into engagement with the cam 4 by a spring 5b and the other arm is pivotally connected to the lever 6 centrally thereof by means of a pin $5_1$. The lever 6 has one end thereof engaged with a lock lever 10, which is pivotally connected to the camera body by means of a pin 10c, whereby the lever 10 may be maintained in inoperative position against the force of a spring 101.

The drive member 2 has a sector gear 2a formed along the outer periphery thereof and connected to a governor shaft 11 via intermediate gears C and D (not shown in FIG. 2). The shaft 11 has mounted thereon a conventional speed governor mechanism G and a stop wheel 12. The stop wheel 12 has a plurality of pawls 12a one of which is engaged by the pawl 1a of a start lever 1. The start lever 1 is pivotally connected to the camera body by means of a pin 1c, and has one end 1d engaged with an intermediate lever 15, which is responsive to movement of a viewfinder mirror 28, so that the start lever 1 is retained in the position of FIG. 1 against the force of a spring 1e while the other end forming a pawl 1b holds the drive member 2 in the position for charging a spring 3. Such position is schematically shown in FIG. 2.

The pin A on the drive member 2, as schematically shown in FIG. 4, pivotally supports a signal lever 21 which has one end connected to a pivotable lever 90 through a pin-slot engagement and the other end engaged with an aperture control arm or member 22a of an interchangeable lens. The lever 90 has a pivot 92 fixed on the unshown camera body.

The arm 22a connects the signal lever 21 to an aperture control ring 22, which is rotatable in accordance with the extent of movement of the lever 21 against the force of a spring 23 to thereby rotate an unshown aperture preset cam ring so as to adjust the aperture in accordance with an indication provided by the ammeter. An aperture ring F has an automatic aperture setting scale "EE" and manual aperture setting scale divisions "1.4" to "16" formed peripherally thereof, and further has a change-over cam F1 formed integrally therewith. When the scale EE is registered with a fixed mark M, a pin 29 may be actuated to rotate a first change-over lever 30 counter-clockwise about its fixed pivot 30a to thereby cause the lower end 30b of the lever 30 to rotate a second change-over lever 31 about its pivot 31a against the force of a spring 311, whereby one end 31b of the lever 31 may be retracted from its position for retaining the lower end 1d of the start lever 1 while a check lever 16 engaged with a pin 312 studded in the lever 31 may be rotated about its fixed pivot 16b by the force of a spring 16c until retained with one end 16a thereof positioned at a predetermined distance t from the upright portion 15a of the intermediate lever 15 which is responsive to the mirror movement. On the other hand, when the fixed mark M is registered with one of the manual aperture setting scale divisions 1.4 to 16, the pin 29 may be pulled down to the lower end portion of the cam F1 by the force of the spring 311 to thereby rotate the levers 30 and 31 in the direction opposite to that described previously, so that the check lever 16 may be actuated into clockwise rotation about its pivot 16b by the pin 312 on the changeover lever 31 against the force of the spring 16c, whereby the end 16a of the lever 16 may be retracted from the rotative path followed by the upright portion 15a of the intermediate lever 15. Also, the end 31b of the change-over lever 31 is brought into engagement with the end 1d of the start lever 1 to retain the start lever 1 in inoperative position.

In response to rotation of the ring F, an unshown preset cam ring may be rotated to preset the aperture to a value corresponding to the scale division registered with the mark M. A pin 27, studded in an unshown aperture blade ring, is responsive to rotation of a diaphragm-associated lever 26 in the direction of arrow to actuate the diaphragm to the preset value. The intermediate lever 15 is pivotally connected to the camera body by means of a pivot 24 common to the lever 26, and has an arm 15b for engagement with a pin 25 on the lever 26 and a studded pin 15c for engagement with a mirror lifting lever 14. The lever 15 is normally biased by a spring 15d into a position where the pin 15c engages the lever 14. The mirror lifting lever 14, as is best shown in FIG. 3, is pivotally connected to the camera body by means of a pivot pin 14a and has an arm 14b engaged with the lifting pin 28a of a viewfinder mirror 28. The mirror lifting lever 14 has a pawl 13 pivotally mounted thereon by means of a pivot 13a and engaged with a lever 19 pivotable about the pivot 14a common to the lever 14. Thus, the levers 14 and 19 are rotatable together about the common pivot 14a. The lever 19 is responsive to shutter charge to rotate in counter-clockwise direction as viewed in FIG. 3, thereby charging a spring 20 extending from the lever 19 to the camera body with one end of the lever in engagement with a retaining lever 18.

Operation of the device according to the present invention will now be described. When a shutter button (not shown) is depressed with the aperture ring F set to EE, the lever 18 is actuated at one end 18a to release its engagement with the lever 19. The lever 19 is thus rotated in the direction of arrow by the force of the spring 20 to thereby rotate the mirror lifting lever 14 with the pawl 13 pivotally mounted thereon. The mirror lifting lever 14 actuates the intermediate lever 15 to rotate it to an extent corresponding to the gap t with respect to the lever 16 until the lever 15 is stopped by the upright portion 15a thereof engaging the end 16a of the lever 16, thus maintaining the mirror 28 and the diaphragm-associated lever 26 in inoperative position. On the other hand, with the rotation of the lever 15 to an extent corresponding to the gap t, the start lever 1 is rotated clockwise by the spring 1e. Such rotation of the start lever 1 causes one end 1a thereof to release the governor shaft 11 of the speed governor mechanism while causing another end 1b to release the drive member 2. Thus, the drive member 2 is now biased by the main spring 3 and rotated counter-clockwise at a predetermined speed by the speed governor mechanism. The master cam 4 attached to the drive member 2 is also rotated. Thereupon, the cam follower lever 5 follows the master cam 4 in the direction of arrow so that the equalizer lever 6 mounted on the lever 5 by means of a pivot pin $5_1$ is rotated about one end 6b thereof which is in engagement with the lock member 10, while the other end 6a of the equalizer lever 6 raises the meter cam 7 in the direction of arrow to thereby clamp the meter needle 9a with respect to the stop 8.

As the drive member 2 is continuedly rotated after the needle 9a has been clamped, the equalizer lever 6 encounters the reaction force from the clamping of the needle so that the lever 6 is rotated about one end 6a thereof while the other end 6b is disengaged from the lock member 10. As a result, the lock member 10 is biased into clockwise rotation by the spring 101 until it is stopped by the engagement of the pawl 10b of the lock member 10 with the pawl 12a of the stop wheel 12 mounted on the governor shaft 11, thus locking the drive member 2 connected thereto.

On the other hand, the rotation of the master cam 4 causes the signal lever 21 pivoted thereto to be tilted about that end thereof which is connected by means of a pin 91 to the pivotable lever 90, as shown in FIG. 4, while the other end of the signal lever 21 actuates the arm 22a of the aperture control member 22 of the interchangeable lens against the force of the spring 23 to rotate the control member 22 to a predetermined position, thus setting the aperture.

When the lock lever 10 is actuated, the return lever 17, which has so far been locked by the lever 10, is rotated about the pivot 1c by the force of the spring 17b so that the lower end of the return lever 17 actuates one arm of the check lever 16 into rotation against the force of the spring 16c, whereby the pawled end 16a of the lever 16 is disengaged from the upright portion 15a of the intermediate lever 15 to permit the lever 15 to be biased into rotation about the pivot 25 by the spring 20 via the levers 19 and 14. When so actuated, the intermediate lever 15 causes the diaphragm-associated lever 26 with the pin 25 to be moved in the direction of arrow so that the end 26a of the latter lever 26 actuates the diaphragm-associated pin 27 of the interchangeable lens to stop down the aperture ring F to the aperture diameter which has been set by the aperture control member 22.

Thereupon, with movement of lever 15, the mirror lifting lever 14 is rotated to lift the mirror 28 and thereafter, one end 19a of the main lever 19 supporting the lever 14 actuates the shutter lock lever 32. This releases an unshown shutter of the conventional type to permit movement of the forward and rearward curtains thereof, whereupon the signal 401 for the completed movement of the rearward curtain is moved in the direction of arrow as indicated in FIG. 3 to thereby unlock the pawl 13 through the action of the release lever 402, thus returning both the automatic diaphragm of the interchangeable lens and the mirror 28 to their respective positions shown in FIG. 1.

Change-over between automatic exposure and manual exposure will now be explained. When the mark EE on the aperture ring F engaged with the aperture control member 22 is registered with the mark M on the camera body, the pin 29 provided on the change-over lever 30 is actuated by the cam F1 of the aperture ring F so that the lever 30 is rotated in the direction of the arrow in FIG. 1 while urging one end of the second change-over lever 31, thereby disengaging second the change-over lever 31 from the check lever 16 so as to make the intermediate lever 15 and the check lever 16 ready for engagement with each other and also render the start lever 1 ready for pivotal movement, thus permitting automatic exposure to take place.

When any desired one of the F-numbers on the aperture ring F is registered with the mark M, the pin 29 follows the cam F1 so as to jut out progressively so that the lever 30 is rotated in the direction opposite to the direction of arrow. As result, the change-over lever 31 is biased into rotation by the spring 311 so that the pin 312 on the lever 31 actuates the check lever 16 into rotation to thereby retract the lever 16 from the rotative path of the upright portion 15a of the lever 15 while the end 31b of the lever 31 is brought into engagement with the lower end 1d of the start lever 1. When the shutter button is depressed thereupon, the lever 19 is rotated and the intermediate lever 15 is rotated clockwise to lift the mirror 28 while causing the diaphragm-associated lever 26 to drive the pin 27, thus adjusting the aperture to a preset value.

In this case, the start lever 1 is retained by the second change-over lever 31 so that it remains stationary retaining the drive member 2 and the stop wheel 12 on the governor shaft 11, thereby maintaining the automatic aperture control member inoperative.

We claim:

1. An automatic exposure control device in an interchangeable lens type camera incorporating an exposure meter having an indicator therein, comprising:

means for scanning said indicator of the exposure meter, said scanning means including a movable scanning member, a stop member, and restoring spring means for said movable member;
aperture control means;
drive means for said movable member of said scanning means and for said aperture control means, said drive means including means for release of said drive means from an initial position thereof and for rotation thereof in a predetermined direction upon initiation of picture taking;
a pivoted locking member shaped and disposed for locking said drive means, in one position of said locking member, by a locking engagement with said drive means, said locking member being biased by bias means for the direction of movement towards said position of locking engagement;
first mechanical transmission means for transmitting the driving force of said drive means to said aperture control means;
second mechanical transmission means for transmitting the driving force of said drive means to said movable member of said scanning means, including a rocker lever pivotably mounted on a force delivery member of said second transmission means and having one end engageable with said locking member and having pivot coupling means on its other end to which said movable member of said scanning means is pivotably coupled for linkage of movement;
said locking member being so mounted and the mutually engaging portions of said locking member and of said rocker lever being so shaped and disposed as to provide a point of rocking engagement of said rocker lever on said locking member which is necessary for maintaining force transmission capability between said rocker lever and said movable member of said scanning means and which is also effective to maintain, said locking member out of engagement with said drive means, so long as movement of said movable member is not arrested by said stop member, while said rocker lever pivots about said point of rocking engagement of said rocker lever on said locking member, said mutually engaging portions providing said rocking engagement being also shaped and disposed that upon arrest of said movable member by said stop means, said rocker lever is forced to pivot on said force delivery member of said second transmission means to disengage from and release said locking member, thereby permitting said locking member to engage with and lock said drive means and simultaneously releasing said movable member of said scanning means for restoration of its initial position by said restoring spring means of said scanning means, regardless of the position of said force delivery member of said second transmitting means.

2. A device according to claim 1, in which said aperture control means includes a diaphragm actuator means and in which means are further provided for restraining the diaphragm actuator means during the operation of said drive means including means for interlocking said restraining means with said locking member shaped and disposed for release of said restraining means, and thereby for release of said diaphragm actuator means into operation, in response to movement of said locking member to its position of locking engagement with said drive means.

3. A device according to claim 1, wherein said drive means is controlled by a speed governor mechanism to drive said aperture control means and said scanning means at a predetermined speed.

4. A device according to claim 3, wherein said speed governor mechanism is provided with a stop member engageable with said locking member to provide said locking engagement of said locking member with said drive means.

5. A device according to claim 1, further provided with start lever means for locking said driving means in an initial position thereof, change-over means having a setting for an automatic exposure control mode and at least one setting for a manual exposure control mode and means responsive to the setting of said change-over means to said manual exposure control mode for holding said start lever means in a position locking said driving means in said initial position when said change-over means is set to the manual exposure mode while allowing said start lever means to be released from such locking position upon initiation of picture taking when said change-over means is set to the automatic exposure control mode.

* * * * *